United States Patent [19]

Cline

[11] Patent Number: 4,703,854

[45] Date of Patent: Nov. 3, 1987

[54] BOOK CONTAINER STRUCTURE

[75] Inventor: Thomas L. Cline, Hanover, Pa.

[73] Assignee: Corra-Board Products Co., Inc., Hanover, Pa.

[21] Appl. No.: 940,446

[22] Filed: Dec. 10, 1986

[51] Int. Cl.[4] .......................... B32B 5/12; B32B 29/08
[52] U.S. Cl. ............................ 206/424; 229/DIG. 2; 229/DIG. 5; 428/105; 428/182; 428/537.5
[58] Field of Search .................... 206/424, 450, 524.2; 229/3.5 R, DIG. 2, DIG. 5; 428/105, 106, 182, 178, 186, 537.5

[56] References Cited

U.S. PATENT DOCUMENTS

| | | | |
|---|---|---|---|
| 1,605,953 | 11/1926 | Howard | 428/113 |
| 1,878,813 | 9/1932 | Block et al. | 206/450 |
| 1,959,193 | 5/1934 | Boeye | 229/DIG. 5 X |
| 2,120,818 | 6/1938 | Steinthal | 206/450 |
| 2,580,141 | 12/1951 | Vidal | 206/424 X |
| 2,794,587 | 6/1957 | Weiss | 229/DIG. 5 X |
| 3,077,222 | 2/1963 | Shanley | 428/186 X |
| 3,160,344 | 12/1964 | Bogren | 206/424 X |
| 3,804,237 | 4/1974 | Christensen et al. | 206/450 |
| 3,904,800 | 9/1975 | Neubauer | 428/182 X |
| 4,262,050 | 4/1981 | Jenkins | 428/186 X |
| 4,286,006 | 8/1981 | Boelter | 428/186 X |
| 4,409,274 | 10/1983 | Chaplin et al. | 428/182 X |
| 4,504,343 | 3/1985 | Green | 428/182 X |

OTHER PUBLICATIONS

Sadauskas, Manual of Business Forms, 1961, Office Publications Inc.
School of Packaging Required Materials, 1977.

Primary Examiner—Stephen Marcus
Assistant Examiner—Tracy Graveline
Attorney, Agent, or Firm—Daniel J. O'Connor

[57] ABSTRACT

This invention relates generally to a book container structure having a particular novel layered construction. In place of a conventional solid chipboard laminated construction, an undulated midstratum layer is utilized in such manner that air cells or pockets are formed within the panels of the structure. An overlayer and an underlayer are adhesively applied to the undulated midstratum layer. The invention results in a book container structure which may be much more economically manufactured while yielding superior end product strength and durability. It has widespread utility as a superior substitute for the currently used solid laminated chipboard design.

The invention utilizes varying fiber lengths and a particular grain line orientation to achieve a highly durable panel structure for use as a book container.

3 Claims, 5 Drawing Figures

BOOK CONTAINER STRUCTURE

BACKGROUND AND OBJECTS OF THE INVENTION

Book container assemblies currently in use are formed of a multi-layered solid laminated chipboard as shown in the prior art drawing of FIG. 2B.

The laminated solid chipboard structures of the prior art typically comprise five or more layers, three of which are shown at 31, 32, and 33 of FIG. 2B. Each layer must be fully joined to an adjacent layer by adhesives 35 as is known in the art.

Chipboard is a term known to those of skill in the art to signify paper products processed from, for example, waste paper materials and thus having relatively short fiber lengths contained therein as shown at numerals 40 in the prior art showing at FIG. 2B.

Because chipboard is, by definition, formed of short fiber length materials, it inherently has low original position memory. That is, once bent, chipboard is unable to successfully return to its original desired flat position. Because of such low memory by chipboard products, it has been required to typically utilize five or more chipboard layers in the formation of book container panels. The required usage of such a high number of chipboard layers has increased adhesives costs and manufacturing time and materials costs generally.

Accordingly, it is an object of the present invention to provide a book container panel structure which is less costly to manufacture and ship than the conventionally used laminated solid chipboard design.

It is a further object to reduce manufacturing costs by effectively using air cells within the book container assembly to reduce overall materials costs.

It is a still further object of the invention to significantly reduce the cost of adhesives used in the production of book containers.

It is a further object to demonstrate a book container which can be bent without the cracking inherent in prior art designs.

It is a still further object to provide a book container structure which has a higher original position memory than has been heretofore known in the art.

It is a further significant object of the present invention to produce a book container with panels having the same or increased thickness as prior art designs while decreasing weight and improving durability.

It is also an object of the invention to demonstrate an advantageous book container structure which utilizes an undulated midstratum layer having significantly longer average fiber lengths relative to an overlayer and underlayer which are formed of chipboard materials having significantly shorter average fiber lengths therein.

It is a further highly significant object of the present invention to produce a book container formed of panels having a higher degree of bending resistance in all directions as compared to prior art systems. Such is accomplished by means of a particular grain alignment pattern.

Further objects and advantages of the present invention will become apparent as the following description proceeds, and the features of novelty characterizing the invention will be pointed out with particularity.

PRIOR ART PATENTS

Cited as illustrative of prior art systems which utilize related principles of design in container structures are the following references: U.S. Pat. No. 4,621,729 issued to Jackson and U.S. Pat. No. 4,619,362 issued to Crowe.

As will be appreciated by those of skill in the art, neither of the above systems teaches the specific principles of applicant's design as set forth herein.

BRIEF DESCRIPTION OF THE DRAWING FIGURES

DESCRIPTION OF THE PREFERRED EMBODIMENT

Figure 1A:
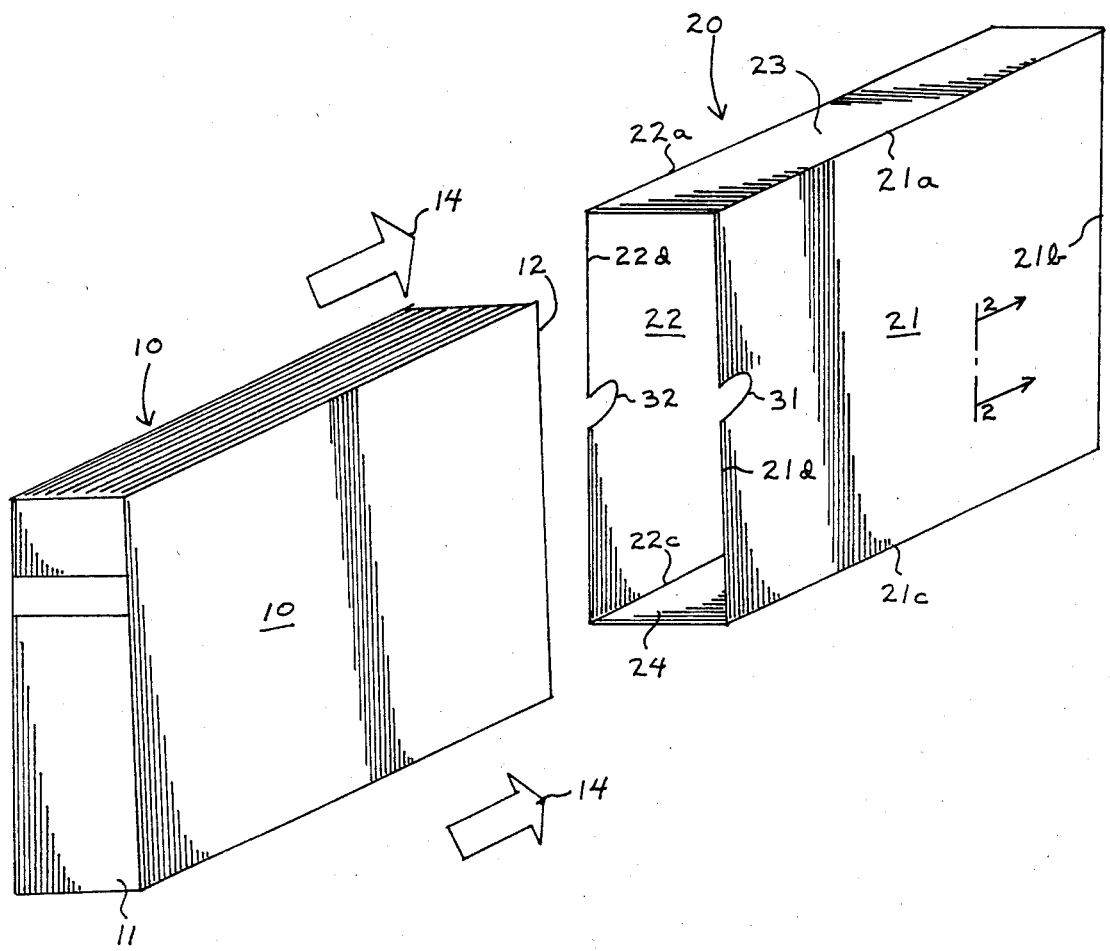
FIG. 1A is an isometric view of the book container of the present invention in association with a book to be stored therein.
Figure 1B:
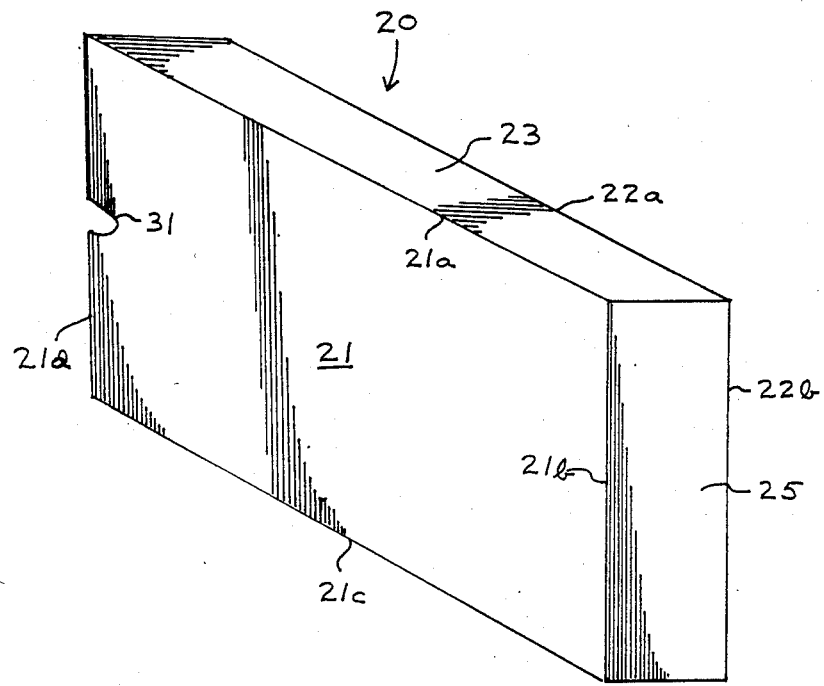
FIG. 1B is an isometric view of the book container being oriented so that the solid rear panel of the structure is shown.

As shown in FIGS. 1A and 1B the overall book container 20 of the present invention includes a first side panel 21 of generally rectangular shape and having an upper edge 21a, a rear edge 21b, a lower edge 21c and a front or leading edge 21d.

A second side panel 22 lies in parallel with the first side panel 21. Second side panel 22 has an upper edge 22a, a rear edge 22b, a lower edge 22c and a front or leading edge 22d.

An upper panel 23 is shown as located between the upper side panel edges 21a and 22a respectively.

Similarly, a lower panel 24 is shown as located between the lower side panel edges 21c and 22c respectively.

As is further illustrated in FIG. 1B, a rear panel 25 is located between the rear side panel edges 21b and 22b respectively.

It is to be understood that the various edges 21a through 21d and 22a through 22d are essentially fold or score lines which are factory applied to the structure utilizing methods known generally in the paperboard arts.

The side panel front edges 21d and 22d have recessed portions, 31 and 32 respectively, formed therein which typically form a semicircular recessed area as shown.

In use of the book container 20, book 10 is slid into the book container 20 as indicated by arrows 14. Book container 20 is sized such that binder panel 11 lies even or flush with the side panel front edges 21d and 22d when the edge 12 of the book 10 contacts the rear panel 25.

It will thus be appreciated that the book 10 can be easily grasped and removed from the book container 20 by way of the semicircular recessed portions 31 and 32.

Figure 2A:
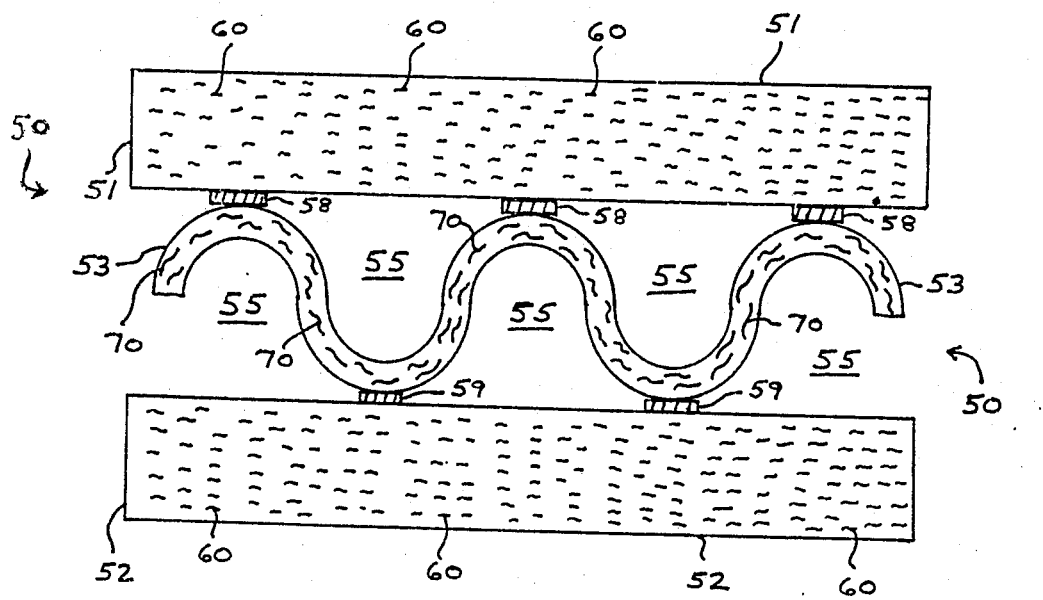
FIG. 2A is a sectional view along lines 2—2 of FIG. 1A illustrating the panel construction details of the present invention.

Each of the book container panels 21, 22, 23, 24 and 25 has a particular internal layered construction 50 as shown in FIG. 2A which is a sectional view taken along lines 2—2 of FIG. 1A.

As shown in FIG. 2A, the panel construction 50 of the present invention comprises an overlayer 51 of chipboard having relatively shorter fiber lengths 60 contained therein. Underlayer 52 also comprises chipboard material with corresponding shorter fiber lengths 60.

FIG. 2A further illustrates an undulated midstratum layer 53 wherein the upper undulation portions are bonded by adhesive 58 to overlayer 51. Similarly, the lower undulation portions are bonded by adhesive shown at 59.

In the preferred embodiment of FIG. 2A, the undulated midstratum layer 53 is further shown as being comprised of a paperboard material having relatively longer fiber lengths 70 as compared to the shorter fiber lengths 60 shown in the overlayer 51 and the underlayer 52.

Figure 2B:
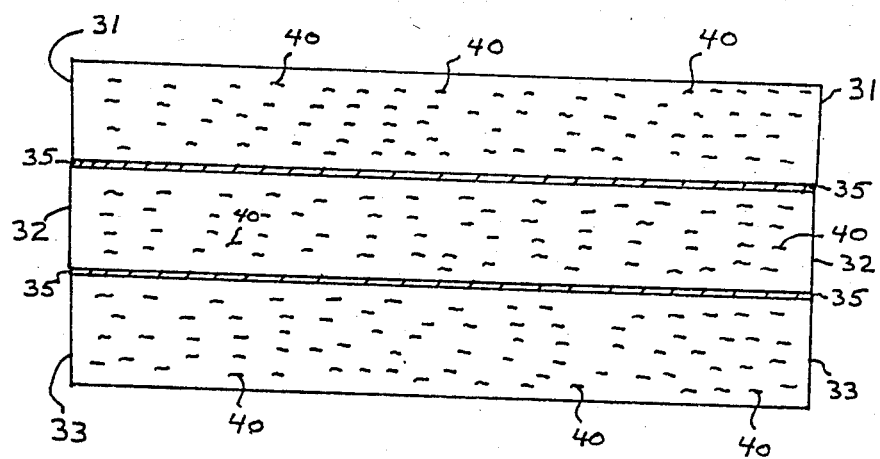
FIG. 2B is a view, similar to FIG. 2A, which illustrates the prior art solid laminated chipboard construction currently used for book container panels.

By reason of the construction of FIG. 2A, it is seen that air cells or spaces 55 are formed internally of the panel structure thus reducing the materials cost in the overall manufacture of the present design. In effect, air spaces are used in place of the chipboard product. It is also apparent that the amount of adhesives 58, 59 required by the inventor's design is greatly reduced as compared to the adhesive requirements shown at 35 of prior art FIG. 2B.

While very significantly reducing manufacturing costs, the inventor herein has also discovered that a superior end product is produced. The longer fiber length 70 materials used in the undulating midstratum layer result in a greater original position memory for the overall structure—i.e. it tends to spring back to its original desired flat position if bent as contrasted to the low memory solid chipboard (FIG. 2B) which tends to crack if bent from its desired flat position.

It will thus be appreciated by those of skill in the art that the book container of the present invention accomplishes its desired goal of book preservation and protection in a highly efficient manner.

The undulated shape of the midstratum layer also produces a spring-like effect for the overall panel 50 so that it is more resilient when subject to bending or other potentially destructive usages.

From the foregoing, it will be appreciated by those of skill in the art that the present invention greatly reduces materials costs and product production time. The weight of the end product panel is significantly reduced thus reducing shipping costs. A thick and durable panel structure is achieved by substituting air spaces and an undulated midstratum layer for the more costly chipboard.

It is further highly significant that, relative to the prior art, the caliper or thickness of a panel may be increased without adding weight to the unit by reason of the air cell structure of the present invention.

As will be appreciated, a ¼-inch thick panel formed utilizing the principles of the invention herein weighs significantly less than a solid ¼-inch chipboard panel, thus reducing shipping weight and cost while increasing product durability.

Finally, the product is more resilient and less susceptible to the cracking problems inherent in the prior art solid laminated chipboard designs.

It is contemplated that adhesives cost savings on the order of 75 percent may be realized by use of the present invention. Further, the use of a product having less internal adhesives results in lower product warpage as compared to chipboard panel systems heretofore known in the art.

It is anticipated that the novel panel construction of the present invention will find widespread use in all systems which currently utilize the solid laminated chipboard design.

In practice of the invention, it is contemplated that the fibers 60 shown in the over and under chipboard layers 51 and 52 would have an average fiber length of 2 mm or less. It is further contemplated that the fibers 70 in the undulating midstratum layer 53 would have an average fiber length of at least 5 mm or more with the possibility of ranging up to 25 mm or more if a higher quality kraft process paper is utilized as the midstratum layer 53.

It is again emphasized that overall product weight and cost are reduced by reason of the air cells 55 which reduce the number of chipboard layers required in a paperboard panel construction. Simultaneously, the durability of the overall paperboard panel 50 is dramatically increased by reason of the undulating midstratum layer 53 and the relatively longer fiber lengths 70 contained therein which, as has been noted, improve the original position memory of the overall panel 50.

Figure 3:
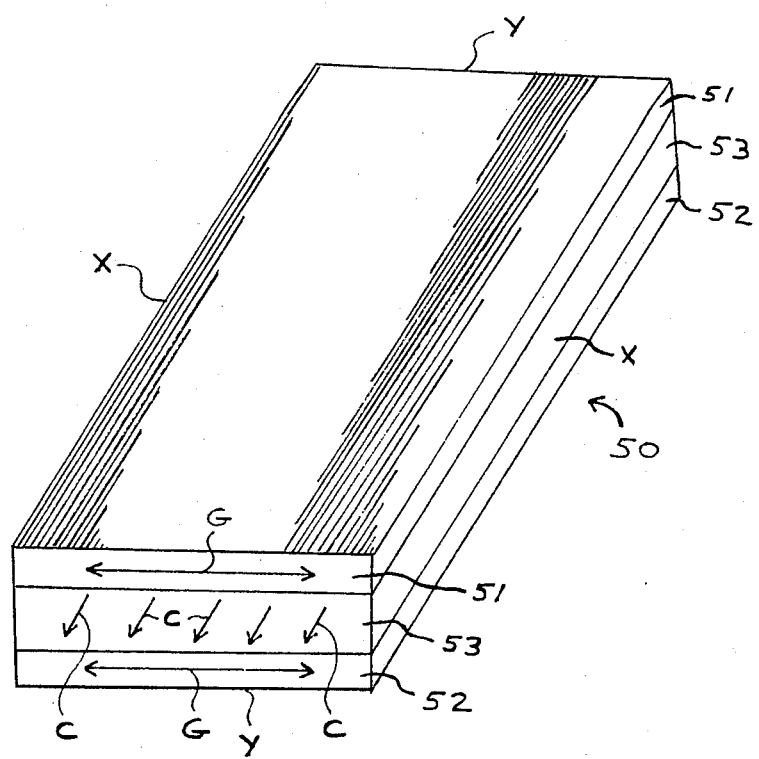
FIG. 3 is an isometric, schematic view of the panel section of FIG. 2A which illustrates the orientation of upper and lower grain lines relative to the channels formed in the midstratum layer of the structure.

Another highly significant aspect of the present invention is illustrated in FIG. 3 which is a schematic, isometric view of the panel section 50 of FIG. 2A.

As before, layers 51 and 52 comprise the chipboard overlayer and underlayer respectively. As shown, the chipboard layers 51 and 52 have grain lines G which run from right to left in FIG. 3. As is known generally in the papermaking arts, the grain line refers to the arrangement of direction of fibers forming the paper.

As is further illustrated in FIG. 3, the channels formed by way of the undulations in the midstratum layer 53 are shown by arrows C as being at right angles to the grain lines G.

The significance of the constructional arrangement shown in FIG. 3 is that a very high degree of bending resistance is achieved. If, for example, the panel of FIG. 3 is grasped at edges Y and a bending force is applied, such force is strongly resisted by reason of the longitudinal strength of the undulating midstratum layer 53. If the panel of FIG. 3 is grasped at edges X and a bending force is applied, such force is strongly resisted by reason of the grain lines G in the chipboard layers 51 and 52; in effect, the force is being applied against the grain and thus the panel has a high degree of bending resistance in this direction also.

The importance of the above feature, i.e. chipboard grain lines of layers 51 and 52 being aligned at right angles to the midstratum layer channels, lies in the fact that a much more durable and long lasting panel is produced as compared to structures heretofore known in the art.

Thus, a much more protective book container structure is produced by forming the various panels 21 through 25 in the manner shown in FIG. 2A and FIG. 3.

While there has been illustrated and described what is at present considered to be a preferred embodiment of the present invention, it will be appreciated that numerous changes and modifications are likely to occur to those of skill in the art, and it is intended herein to cover all those changes and modifications which fall within the true spirit and scope of the present invention.

I claim:

1. A book container means (20) for use in combination with a book (10) to be contained, said book container means comprising:
- a rectangular first side panel (21) having a top edge (21a), a rear edge (21b), a lower edge (21c) and a forward edge (21d),
- a rectangular second side panel (22) positioned in parallel to said first side panel (21) and having a top edge (22a), a rear edge (22b), a lower edge (22c) and a forward edge (22d),
- a top panel (23) extending between said top edge (21a) of the first side panel (21) and said top edge (22a) of the second side panel (22),
- a lower panel (24) extending between said lower edge (21c) of the first side panel (21) and said lower edge (22c) of the second side panel (22),
- a rear panel (25) extending between said rear edge (21b) of the first side panel (21) and said rear edge (22b) of the second side panel (22),
- wherein said forward edges (21d, 22d) of said first and second side panels (21,22) have recessed portion means (31,32) formed therein to facilitate manual grasping of a book (10) stored within said book container (20),
- wherein each of said panels (21,22, 23, 24, 25) is comprised of a layered paperboard panel structure (50),
- said paperboard panel structure (50) having an overlayer (51) comprised of chipboard material having relatively shorter fiber length (60) contained therein,
- said paperboard panel structure having an underlayer (52) comprised of chipboard material having relatively shorter fiber lengths (60) contained therein,
- said paperboard panel structure further having an undulating midstratum layer (53) between said overlayer (51) and underlayer (52),
- wherein the upper undulation portions of said midstratum layer (53) are secured to said overlayer (51) by adhesive means (58),
- and wherein the lower undulation portions of said midstratum layer (53) are secured to said underlayer (52) by adhesive means (59),
- said paperboard panel structure providing means wherein air cells (55) are formed internally thereof such that a given panel caliper or thickness may be maintained while reducing the number of chipboard layers required for construction,
- wherein said chipboard overlayer (51) and said chipboard underlayer (52) each have grain lines (G) formed therein and wherein said undulating midstratum layer (53) forms channels which are arranged at right angles (C) to the grain lines (G) formed in said overlayer (51) and said underlayer (52) to provide means for enhanced bending resistance in the overall paperboard panel construction(.),
- wherein said undulating midstratum layer (53) has relatively longer fiber lengths (70) contained therein as compared to the relatively shorter fiber lengths (60) contained in said overlayer (51) and said underlayer (52),
- wherein the average fiber length (60) of said overlayer (51) and said underlayer (52) is two millimeters or less,
- wherein the average fiber length (70) of said undulating midstratum layer (53) is five millimeters or more,
- wherein said air cells (55) are formed between said overlayer (51) and said underlayer (52) by way of said undulating midstratum layer (53) such that the overall weight of a panel (50) is reduced while improving panel strength via the spring-like effect of said midstratum layer and by the relatively longer fiber lengths (70) contained in said midstratum layer.

2. A paperboard panel construction means (50) for use an combination with a book container structure (20) comprising:
- an overlayer (51) of short fiber length chipboard material having grain lines (G) formed therein,
- an underlayer (52) of short fiber length chipboard material having grain lines (G) formed therein,
- an undulating midstratum layer (53) of relatively longer fiber length material,
- said undulating midstratum layer (53) being adhesively applied (58, 59) to said overlayer (51) and said underlayer (52),
- wherein channels formed by said undulating midstratum layer (53) lie in a direction (C) at right angles to said chipboard grain lines (G) to provide means whereby bending resistance in the paperboard panel construction is increased.

3. A method of constructing a paperboard panel means (50) for use in combination with a book container structure (20), said panel means (50) having an overlayer (51) of chipboard material with grain lines (G) formed therein, an underlayer (52) of chipboard material with grain lines (G) formed therein, and an undulating midstratum layer (53) having channels formed therein, said method of construction comprising:
- (a) adhesively securing said indulating midstratum layer (53) to said chipboard underlayer (52) such that the grain lines (G) of said underlayer (52) are aligned at right angles to the channels formed (C) in said undulating midstratum layer (53),
- (b) adhesively securing said chip-board overlayer (51) to said undulating midstratum layer (53) such that the grain lines (G) of said overlayer (51) are aligned at right angles to the channels formed (C) in said undulating midstratum layer (53), whereby the bending force resistance of said constructed paperboard panel (50) is increased.

* * * * *